United States Patent
Murakami et al.

(10) Patent No.: US 9,150,092 B2
(45) Date of Patent: Oct. 6, 2015

(54) DRIVE UNIT FOR VEHICLE

(71) Applicants: Akira Murakami, Gotenba (JP); Takahiro Shiina, Susono (JP); Tadashi Fujiyoshi, Susono (JP); Takao Watanabe, Nagakute (JP); Eiji Tsuchiya, Nisshin (JP)

(72) Inventors: Akira Murakami, Gotenba (JP); Takahiro Shiina, Susono (JP); Tadashi Fujiyoshi, Susono (JP); Takao Watanabe, Nagakute (JP); Eiji Tsuchiya, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/378,213

(22) PCT Filed: Feb. 13, 2013

(86) PCT No.: PCT/IB2013/000180
§ 371 (c)(1),
(2) Date: Aug. 12, 2014

(87) PCT Pub. No.: WO2013/121266
PCT Pub. Date: Aug. 22, 2013

(65) Prior Publication Data
US 2015/0014073 A1   Jan. 15, 2015

(30) Foreign Application Priority Data

Feb. 14, 2012   (JP) .................................. 2012-029389

(51) Int. Cl.
*B60K 6/448*   (2007.10)
*B60K 6/26*   (2007.10)
*B60K 6/547*   (2007.10)
*F16H 3/00*   (2006.01)
*H02K 51/00*   (2006.01)
(Continued)

(52) U.S. Cl.
CPC . *B60K 6/448* (2013.01); *B60K 6/26* (2013.01); *B60K 6/547* (2013.01); *F16H 3/006* (2013.01); *H02K 16/02* (2013.01); *H02K 51/00* (2013.01); *B60K 2006/262* (2013.01); *B60K 2006/541* (2013.01); *B60Y 2400/608* (2013.01); *Y02T 10/6243* (2013.01); *Y10S 903/906* (2013.01)

(58) Field of Classification Search
CPC ........ F16H 3/006; B60K 6/547; B60K 6/448; Y10S 903/906; H02K 16/02
USPC .............................. 180/65.21, 65.265; 475/5
See application file for complete search history.

(56) References Cited

U.S. PATENT DOCUMENTS

| | | | |
|---|---|---|---|
| 6,159,127 A | 12/2000 | Loeffler et al. | |
| 6,666,787 B2* | 12/2003 | Doepke | 475/5 |
| 8,047,314 B2* | 11/2011 | Oba et al. | 180/65.265 |

(Continued)

FOREIGN PATENT DOCUMENTS

| | | | |
|---|---|---|---|
| EP | 1 302 697 A2 | 4/2003 | |
| JP | 1 275 547 A2 | 1/2003 | |

(Continued)

*Primary Examiner* — John Walters
*Assistant Examiner* — Brian Swenson
(74) *Attorney, Agent, or Firm* — Sughrue Mion, PLLC

(57) ABSTRACT

A drive unit for a vehicle includes: an engine (2); a compound motor (3) having a first rotor and a second rotor that are differentially rotatable with each other; and an automatic transmission (4A) that delivers power output of the engine (2), which is input via the compound motor (3), to an output shaft (33), in which the first rotor is connected to an input side of a gear pair that corresponds to an even shift speed and the second rotor is connected to an input side of a gear pair that corresponds to an odd shift speed.

12 Claims, 6 Drawing Sheets

(51) Int. Cl.
*H02K 16/02* (2006.01)
*B60K 6/54* (2007.10)

(56) References Cited

U.S. PATENT DOCUMENTS

| | | | |
|---|---|---|---|
| 8,523,734 B2* | 9/2013 | Mepham et al. | 477/3 |
| 8,620,507 B2* | 12/2013 | Akutsu et al. | 701/22 |
| 2003/0013569 A1 | 1/2003 | Doepke | |
| 2003/0069103 A1 | 4/2003 | Ibamoto et al. | |
| 2005/0032598 A1 | 2/2005 | Hanyu et al. | |
| 2010/0311540 A1 | 12/2010 | Hellenbroich | |
| 2010/0326751 A1 | 12/2010 | Markl | |
| 2011/0034282 A1 | 2/2011 | Akutsu et al. | |

FOREIGN PATENT DOCUMENTS

| | | |
|---|---|---|
| JP | 2003-106389 A | 4/2003 |
| JP | 2003-113934 A | 4/2003 |
| JP | 2005-054938 A | 3/2005 |
| JP | 2009-274536 A | 11/2009 |
| JP | 2010-526710 A | 8/2010 |
| JP | 2011-11736 A | 1/2011 |
| JP | 2011-025911 A | 2/2011 |

* cited by examiner

DRIVE UNIT FOR VEHICLE

CROSS REFERENCE TO REALTED APPLICATIONS

This application is a National Stage of International Application No. PCT/IB2013/000180, filed Feb. 13, 2013, claiming priority from Japanese Patent Application No. 2012-029389, filed Feb. 14, 2014, the contents of all of which are incorporated herein by reference in their entirety.

BACKGROUND OF THE INVENTION

1. Field of the Invention

The present invention relates to a drive unit for a vehicle that delivers power output of an engine to an automatic transmission via a motor that includes a plurality of rotors.

2. Description of Related Art

A drive unit for a vehicle has been known that includes a compound motor having a winding rotor and a magnet rotor that can differentially rotate with each other and being provided with a stator on the outer side of the magnet rotor and that delivers power output of an engine to a transmission via the compound motor (Japanese Patent Application Publication No. 2009-274536 (JP 2009-274536 A)). The other prior art documents that relate to the present invention include Japanese Patent Application Publication No. 2011-25911 (JP 2011-25911 A), Japanese Patent Application Publication No. 2010-526710 (JP 2010-526710 A), and Japanese Patent Application Publication No. 2005-54938 (JP 2005-54938 A).

Various types of an automatic transmission have been developed for vehicles such as an automatic transmission of a planetary gear type (AT), a continuously variable transmission (CVT), an automated manual transmission (AMT), and a dual clutch transmission (DCT). The AMT has an advantage over the others in terms of power transmission efficiency due to the relatively small number of friction engagement elements such as a clutch and a brake.

When the AMT is installed in the drive unit for a vehicle, the AMT interposes a neutral state during changing of a shift speed, which leads to disconnection of torque transmission. In a unit disclosed in JP 2009-274536 A, the power output of an engine, which is routed through a compound motor, is delivered to an input shaft of a transmission.

SUMMARY OF THE INVENTION

If it is assumed that an AMT is installed as a transmission for the unit disclosed in JP 2009-274536 A, it is difficult to avoid disconnection of torque transmission that occurs during changing of the shift speed. The present invention provides a drive unit for a vehicle that can restrict disconnection of torque transmission that occurs during changing of the shift speed.

The drive unit for a vehicle according to an aspect of the present invention includes: an engine; a differential motor having a first rotor that is rotatably connected to the engine and a second rotor that can rotate differentially with respect to the first rotor, the differential motor being able to output power output of the engine from the first rotor or the second rotor; and an automatic transmission that is capable of switch between plural shift speeds, the automatic transmission having plural gear pairs, each of which corresponds to one of the shift speeds, and an output shaft that is connected to the output side of the plural gear pairs, the automatic transmission receiving the power output of the engine via the differential motor, the automatic transmission delivering the received power output of the engine to the output shaft, one of the first rotor and the second rotor being connected to the input side of a gear pair that corresponds to an even shift speed among the plural shift speeds, and the other of the first rotor and the second rotor being connected to the input side of a gear pair that corresponds to an odd shift speed among the plural shift speeds.

With this drive unit for a vehicle, the power output of the engine is delivered to a gear pair that corresponds to one of the even shift speed and the odd shift speed of the automatic transmission via one of the first rotor and the second rotor in the differential motor, and the power output of the engine is also delivered to a gear pair that corresponds to the other of the even shift speed and the odd shift speed of the automatic transmission via the other of the first rotor and the second rotor in the differential motor. This allows delivery of the power output of the engine to a gear pair that corresponds to a predetermined shift speed before the shift speed is changed in sequence. Accordingly, it is possible to change between the adjacent shift speeds without interposing a neutral state. Therefore, it is possible to restrict torque transmission from being disconnected during changing of the shift speed.

In the above drive unit, the first rotor may be connected to the input side of a gear pair that corresponds to the even shift speed, and the second rotor may be connected to the input side of a gear pair that corresponds to the odd shift speed. According to this aspect, the power output of the engine can be delivered to the gear pair that corresponds to the even shift speed via the first rotor and to the gear pair that corresponds to the odd shift speed via the second rotor.

In the above drive unit, the first rotor may be connected to an input side of a gear pair that corresponds to the highest shift speed of the plural shift speeds. According to this aspect, the power output of the engine is mechanically delivered to the gear pair that corresponds to the highest shift speed without electric conversion. Therefore, it is possible to improve fuel efficiency of a vehicle in which the drive unit according to this aspect is installed at high speed.

In the above drive unit, the second rotor may be connected to an input side of a gear pair that corresponds to the highest shift speed of the plural shift speeds. According to this aspect, it is possible with the differential motor to continuously change rotational speed of the engine by operating the differential motor to adjust a difference in rotational speed between the first rotor and the second rotor. Accordingly, the engine can be operated at an operating point where thermal efficiency of the engine is the highest by using the above continuously changing function of the differential motor when a vehicle in which the drive unit according to this aspect is installed runs at the highest shift speed. Therefore, it is possible to improve the fuel efficiency of the above vehicle at high speed.

In the above drive unit, the first rotor may be a winding rotor that is capable of being energized, the second rotor may be a magnet rotor that holds a permanent magnet, and the differential motor may be a compound motor in which the magnet rotor is coaxially disposed with the winding rotor on a radially outer side of the winding rotor and in which a stator is fixed on a radially outer side of the magnet rotor in an unrotatable state. According, to this aspect, the power output of the engine is delivered to a gear pair that corresponds to one of the even shift speed and the odd shift speed of the automatic transmission via one of the winding rotor and the magnet rotor of the compound motor, and the power output of the engine is also delivered to a gear pair that corresponds to the other of the even shift speed and the odd shift speed of the automatic transmission via the other of the winding rotor and the magnet rotor of the compound motor. Accordingly, it is possible to deliver the power output of the engine to a gear pair that corresponds to a predetermined shift speed before the shift speed is changed in sequence. This allows changing between the adjacent shift speeds without interposing the neutral state. Therefore, it is possible to restrict torque transmission from being disconnected during changing of the shift speed.

In the above drive unit, the winding rotor may be connected to the input side of a gear pair that corresponds to the even shift speed, and the magnet rotor may be connected to the input side of a gear pair that corresponds to the odd shift speed. In this case, the power output of the engine can be delivered to a gear pair that corresponds to the even shift speed via the winding rotor and to a gear pair that corresponds to the odd shift speed via the magnet rotor.

In the above drive unit, the winding rotor may be connected to an input side of a gear pair that corresponds to the highest shift speed of the plural shift speeds. In this case, the power output of the engine is mechanically delivered to the gear pair that corresponds to the highest shift speed without electric conversion. Therefore, it is possible to improve the fuel efficiency of a vehicle in which this drive unit is installed at high speed.

In the above drive unit, the magnet rotor may be connected to an input side of the gear pair that corresponds to the highest shift speed of the plural shift speeds. In this case, it is possible with the compound motor to continuously change the rotational speed of the engine by operating the compound motor to adjust the difference in rotational speed between the winding rotor and the magnet rotor. Accordingly, the engine can be operated at the operating point where the thermal efficiency of the engine is the highest by using the above continuously changing function of the compound motor when a vehicle in which this drive unit is installed runs at the highest shift speed. Therefore, it is possible to improve the fuel efficiency of the above vehicle at high speed.

The above drive unit may further include a clutch that is able to connect or disconnect power transmission between the winding rotor and the automatic transmission. In this case, it is possible with the clutch to disconnect torque transmission from the winding rotor to the automatic transmission when needed.

In the above drive unit, the plural shift speeds may include a startup shift speed that is used to start the vehicle, and the magnet rotor may be connected to an input side of a gear pair that corresponds to the startup shift speed. Like a torque converter, the compound motor can amplify and output the power output of the engine, which is delivered to the winding rotor, from the magnet rotor. Therefore, it is possible to start a vehicle in which this drive unit is installed at the startup shift speed by using said function of the compound motor. In addition, even when enough torque cannot be output from the magnet rotor and thus the startup shift speed cannot be used due to breakage of the compound motor, it is possible to start a vehicle by using a shift speed that is adjacent to the startup shift speed by operating the clutch to secure torque transmission between the winding rotor and the automatic transmission. In other words, when the startup shift speed cannot be used due to breakage of the compound motor as described above, the clutch is operated such that torque transmission from the winding rotor to which the engine is connected to the automatic transmission is gradually increased. Accordingly, it is possible to start the above vehicle by using a gear pair to which the winding rotor is connected. Therefore, a situation can be avoided where a vehicle cannot be started at all due to breakage of the compound motor. That is, a so-called limp home property of the drive unit is improved.

The above drive unit may further include a motor generator having a third rotor and a stator. The third rotor may integrally rotate with the second rotor of the differential motor. The stator may be coaxially disposed with the third rotor and fixed in an unrotatable state. In this case, electricity can be generated by using the motor generator. Accordingly, it is possible to retrieve energy during deceleration into the motor generator. This improves electricity consumption efficiency of the drive unit.

In the above drive unit, the first rotor and the second rotor may be separated from the stator in an axial direction.

Unless otherwise specified, "connection" in the present invention means a state where power can be transmitted from one element to another element. Therefore, a state where one element is "connected" to another element includes not only a state where one element is directly and mechanically coupled to another element without interposing a different element therebetween but also a state where a single element or plural elements are interposed between one element and another element.

As it has been described so far, according to the drive unit for a vehicle of the present invention, it is possible to deliver power output of the engine to a gear pair that corresponds to a predetermined shift speed before the shift speed is changed in sequence. Accordingly, it is possible to change between the adjacent shift speeds without interposing a neutral state. Therefore, it is possible to restrict torque transmission from being disconnected during changing of the shift speed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS (First Embodiment)

Figure 1:
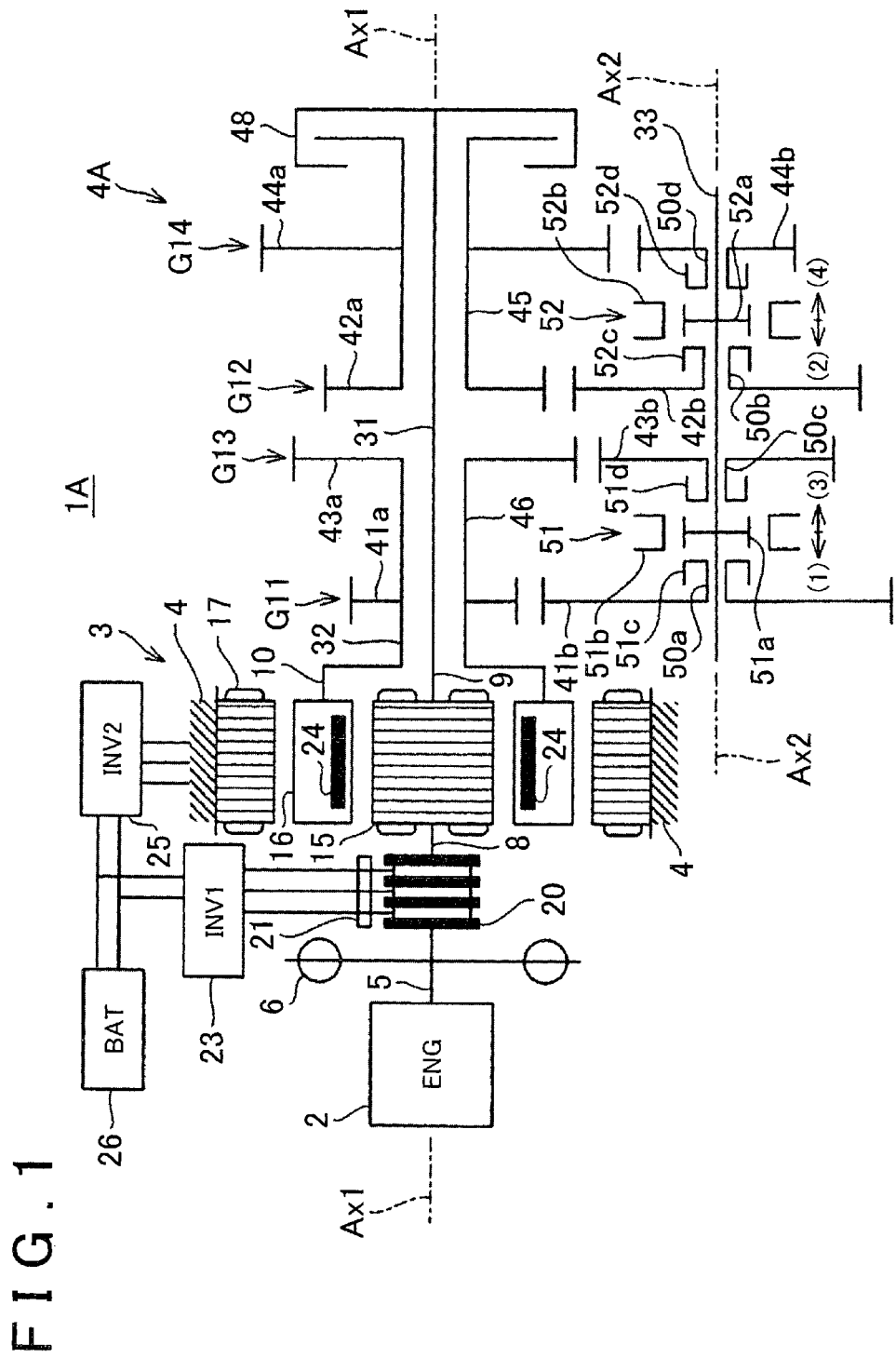
FIG. 1 is a schematic view of a drive unit for a vehicle according to a first embodiment of the present invention.

A drive unit for a vehicle 1A shown in FIG. 1 is installed in a vehicle such a motor vehicle, and the vehicle functions as a hybrid vehicle. The drive unit for a vehicle (hereinafter referred to as the drive unit) 1A includes an internal combustion engine (hereinafter referred to as an engine) 2, a compound motor 3 which is connected to the engine 2, and an automatic transmission 4A to which power output of the engine 2 is delivered via the compound motor 3. Although details are not shown, the engine 2 is configured as a reciprocating engine that has a plurality of cylinders. The power output of the engine 2 is transmitted to a crankshaft 5. A damper device 6 that absorbs variation in torque of the engine 2 is provided between the crankshaft 5 and the compound motor 3.

The compound motor 3 includes an input motor shaft 8 that is disposed on a rotational axis Ax1 and two output motor shafts 9, 10. The input motor shaft 8 is connected to the crankshaft 5. The second output motor shaft 10 that is formed in a hollow shape is disposed on the outer side of the first output motor shaft 9. These two output motor shafts 9, 10 are coaxially disposed for relative rotation with each other. The compound motor 3 further includes a winding rotor 15 that integrally rotates with the input motor shaft 8 and the first output motor shaft 9, a magnet rotor 16 that is coaxially disposed on the radially outer side of the winding rotor 15 in a state to differentially rotate with respect to the winding rotor 15, and a stator 17 that is fixed to a fixing member such as a casing 4 in an unrotatable state and is coaxially disposed on the radially outer side of the magnet rotor 16. The winding rotor 15 is to an example of a first rotor according to an embodiment of the present invention while the magnet rotor 16 corresponds to an example of a second rotor according to the present invention.

The winding rotor 15 is electrically connected to a first inverter 23 via a slip ring 20 and a brush 21 that are mounted on the input motor shaft 8. The magnet rotor 16 holds plural permanent magnets 24 that are aligned in a state where polarities thereof are adjusted in a circumferential direction of the magnet rotor 16. The stator 17 is electrically connected to a second inverter 25. Each of the inverters 23, 25 is electrically connected to a battery 26.

Because both of the winding rotor 15 and the stator 17 in the compound motor 3 have a coil, these coils generate a rotating magnetic field, and the magnet rotor 16 can be rotationally driven by the rotating magnetic field. In other words, the compound motor 3 encloses a motor generator that is constituted from the winding rotor 15 and the magnet rotor 16 and another motor generator that is constituted from the stator 17 and the magnet rotor 16. The compound motor 3 appropriately uses these two motor generators to transmit the power output of the engine 2 to the automatic transmission 4A.

When the input motor shaft 8 is rotationally driven by the engine 2, electricity is generated at the coil of the winding rotor 15, and then a magnetic force is generated. With rotation of the winding rotor 15, the magnet rotor 16 is rotationally driven in the same direction. Accordingly, the power output of the engine 2 is delivered (output) to the automatic transmission 4A via the first output motor shaft 9 and the second output motor shaft 10 that are connected to the two rotors 15, 16. That is, the compound motor 3 can output the received power output of the engine 2 from the two rotors 15, 16. The compound motor 3 is an example of a differential motor according to an embodiment the present invention because the compound motor 3 has the winding rotor 15 and the magnet rotor 16 that can differentially rotate with respect to each other and output the power output of the engine 2 from these rotors 15, 16.

The compound motor 3 can obtain the electricity that is generated at the winding rotor 15 via the first inverter 23 and can also supply the electricity to the stator 17 via the second inverter 25. The electricity supplied to the stator 17 is used to drive the magnet rotor 16. Accordingly, the compound motor 3 has a function to amplify torque by which the torque delivered to the winding rotor 15 is amplified and then output from the second output motor shaft 10. It should be noted that the compound motor 3 can return electricity, which is generated at the winding rotor 15, to the battery 26 when the electricity that is to be supplied to the stator 17 becomes excessive.

The automatic transmission 4A is configured as an automotive manual transmission (AMT) as shown in FIG. 1. The automatic transmission 4A has four shift speeds from a first shift speed to a fourth shift speed. The first shift speed is set as a startup shift speed. The automatic transmission 4A follows a predetermined shift schedule to automatically change the shift speed in accordance with a vehicular speed or a vehicular load. The automatic transmission 4A can also accept gear shifting by a driver and change the shift speed according to the gear shifting operation. It is possible with the automatic transmission 4A to change between the adjacent shift speeds; however, the shift speed cannot be changed in a disordered manner such as from the first shift speed to the third shift speed or from the fourth shift speed to the second shift speed. In addition, the drive unit 1A does not include a reverse shift speed. Reversing a vehicle can be achieved by reverse rotation of the compound motor 3 in a state where the first shift speed is selected.

The automatic transmission 4A has two input shafts 31, 32 and an output shaft 33. The first input shaft 31 is provided to integrally rotate with the first output motor shaft 9 of the compound motor 3 about the rotational axis Ax1. The second input shaft 32 is formed in a hollow shape and is disposed on the outer side of the first input shaft 31. The second input shaft 32 is provided to integrally rotate with the second output motor shaft 10 of the compound motor 3 about the rotational axis Ax1. The output shaft 33 is provided to be rotatable about a rotational axis Ax2 that is parallel with the rotational axis Ax1. The power delivered to the output shaft 33 is distributed to right and left drive wheels (not shown) by a differential mechanism (not shown).

The automatic transmission 4A includes four gear pairs G11, G12, G13, and G14 that correspond to four shift speeds and whose transmission ratios (gear ratios) differ from each other. The first gear pair G11, the second gear pair G12, the third gear pair G13, and the fourth gear pair G14 correspond to the first gear shift speed, the second shift speed, the third shift speed, and the fourth shift speed, respectively. The first gear pair G11 includes a drive gear 41*a* and a driven gear 41*b* that mesh with each other. The second gear pair G12 includes a drive gear 42*a* and a driven gear 42*b* that mesh with each other. The third gear pair G13 includes a drive gear 43*a* and a driven gear 43*b* that mesh with each other. The fourth gear pair G14 includes a drive gear 44*a* and a driven gear 44*b* that mesh with each other.

The automatic transmission 4A includes two drive gear shafts 45, 46 to which the drive gears 41*a* to 44*a* included in the gear pairs G11 to G14 are fixed. The first drive gear shaft 45 is formed in a hollow shape and is coaxially disposed on the outer side of the first input shaft 31. The first drive gear shaft 45 and the first input shaft 31 are connected to each other via a clutch 48. The clutch 48 is an automatic electromagnetic clutch that includes an actuator (not shown). The clutch 48 disconnects power transmission from the first output motor shaft 9 to the first drive gear shaft 45 through the first input shaft 31 when needed. The second drive gear shaft 46 is formed in a hollow shape and is integrated with the second input shaft 32. The automatic transmission 4A includes four driven gear shafts 50*a* to 55*d* to which the driven gears 41 *b* to 44 *b* included in the gear pair G11 to G14 are fixed respectively. Each of the driven gear shafts 50 *a* to 50 *d* is formed in a hollow shape and coaxially disposed with the output shaft 33 so as to be relatively rotatable with respect to the output shaft 33 about the rotational axis Ax2.

As shown in the drawing, the drive gears 41*a* to 44*a* of the gear pairs G11 to G14 and the driven gears 41*b* to 44*b* of the gear pairs G11 to G14- are respectively fixed to the drive gear shafts 45, 46 and the driven gear shafts 50a to 50d. Accordingly, the gear pairs G11 to G14 are interposed between the first input shaft 31 or the second input shaft 32 and the output shaft 33. More specifically, among the four shift speeds, the second gear pair G12 and the fourth gear pair G14 that correspond to the even gear shift speeds are interposed between the first input shaft 31 and the output shaft 33, and the first gear pair G11 and the third gear pair G13 that correspond to rest of the shift speeds, which is the odd shift speeds, are interposed between the second input shaft 32 and the output shaft 33.

The automatic transmission 4A is provided with two coupling devices 51, 52 to achieve changing of the shift speed by selectively coupling the driven gears 41b to 44b included in the gear pairs G11 to G14 to the output shaft 33. Each of the coupling devices 51, 52 is configured as a claw clutch. The first coupling device 51 is disposed between the first gear pair G11 and the third gear pair G13. The first coupling device 51 handles changing from/to the first shift speed and the third shift speed. The second coupling device 52 is disposed between the second gear pair G12 and the fourth gear pair G14. The second coupling device 52 handles changing from/to the second shift speed and the fourth shift speed.

The first coupling device 51 includes: an output-side hub 51a that integrally rotates with the output shaft 33; a sleeve 51b that is spline-fitted to the outer periphery of the output-side hub 51a in a state where relative rotation with respect to the output-side hub 51a is restricted and relative movement in a direction to the rotational axis Ax2 is allowed; an input-side hub 51c that integrally rotates with the driven gear shaft 50a; and an input-side hub 51d that integrally rotates with the driven gear shaft 50c. Each of the input-side hubs 51c, 51d can mesh with a spline tooth that is formed on the inner periphery of the sleeve 51b. Because the sleeve 51b moves in a direction (1) in the drawing and then the output-side hub 51a and the input-side hub 51c simultaneously mesh with the sleeve 51b, the output shaft 33 and the driven gear shaft 50a rotate integrally. Then, the driven gear 41b that is on the output side of the first gear pair G11 couples with the output shaft 33 for integral rotation (i.e., the driven gear 41b that is on the output side of the first gear pair G11 couples with the output shaft 33 so that the driven gear 41b integrally rotates with the output shaft 33). Accordingly, the shift speed is changed to the first shift speed at which the second input shaft 32 and the output shaft 33 rotate differentially at the gear ratio of the gear pair G11. Similarly, the shift speed is changed to the third shift speed by movement of the sleeve 51b in a direction (3) in the drawing. Similar to the first coupling device 51, the second coupling device 52 has an output-side hub 52a, a sleeve 52b, an input-side hub 52c, and an output-side hub 52d. The shift speed is changed to the second shift speed by movement of the sleeve 52b in a direction (2) in the drawing and to the fourth shift speed by movement of the sleeve 52b in a direction (4) in the drawing.

Because the drive unit 1A has the illustrated configuration, the winding rotor 15 of the compound motor 3 is connected to the drive gears 42a, 44a of the second gear pair G12 and the fourth gear pair G14 that correspond to the even shift speeds of the automatic transmission 4A, and the magnet rotor 16 of the compound motor 3 is connected to the drive gears 41a, 43a of the first gear pair G11 and the third gear pair G13 that correspond to the odd shift speeds of the automatic transmission 4A. Accordingly, the power output of the engine 2 is delivered to the second gear pair G12 and the fourth gear pair G14 that correspond to the even shift speeds via the winding rotor 15 and to the first gear pair G11 and the third gear pair G13 that correspond to the odd shift speeds via the magnet rotor 16. Therefore, it is possible to deliver the power output of the engine to a gear pair that corresponds to a predetermined shift speed before the shift speed of the automatic transmission 4A is changed in sequence. For example, when the shift speed is changed from the first shift speed to the second shift speed, the sleeve 52b of the second coupling device 52 is moved in the direction (3) in the drawing before the sleeve 51b of the first coupling device 51 that is situated in the direction (1) in the drawing is returned to a position in the drawing. Accordingly, it is possible to change the shift speed from the first shift speed to the second shift speed without interposing a neutral state where torque transmission is disconnected. This applies to all cases where the shift speed is changed between the adjacent shift speeds. Therefore, the drive unit 1A can restrict torque transmission from being disconnected when the shift speed of the automatic transmission 4A is changed.

In the drive unit 1A, because the winding rotor 15 of the compound motor 3 is connected to the drive gear 44a of the fourth gear pair G14 that corresponds to the fourth shift speed, which is the highest shift speed, the power output of the engine 2 is mechanically delivered to the fourth gear pair G14 without electrical conversion. Therefore, the fuel efficiency of a vehicle in which the drive unit 1A is installed improves at high speed.

In the drive unit 1A, the first shift speed is set as a startup shift speed. At startup of a vehicle in which the drive unit 1A is installed, the magnet rotor 16 of the compound motor 3 is connected to the first gear pair G11 that corresponds to the first shift speed. Accordingly, it is possible to start the vehicle in the same manner as a vehicle in which a torque converter is installed because the power output of the engine 2 is amplified by using the above-mentioned function of the compound motor 3 to amplify the torque. In addition, the drive unit 1A has the clutch 48 that is provided on a power transmission pathway between the winding rotor 15 and the second gear pair G12 or the fourth gear pair G14 that respectively correspond to the second shift speed or the fourth shift speed, which are the even shift speeds. Thus, even when enough torque cannot be output from the magnet rotor 16 and thus the first shift speed, which is usually used to start a vehicle, cannot be used due to breakage of the compound motor 3, it is possible to start a vehicle by using the second shift speed that is adjacent to the first shift speed by operating the clutch 48 to secure torque transmission between the winding rotor 15 and the automatic transmission 4A. In other words, when the first shift speed cannot be used, the clutch 48 is operated to gradually increase the torque transmission from the winding rotor 15 to the automatic transmission 4A. Accordingly, a vehicle can be started by using the second gear pair G12 to which the winding rotor 15 is connected. Therefore, a situation can be avoided where startup of a vehicle becomes absolutely impossible due to breakage of the compound motor 3. That is, because the clutch 48 can be used as described above, a so-called limp home property is improved.

(Second Embodiment)

Figure 2:
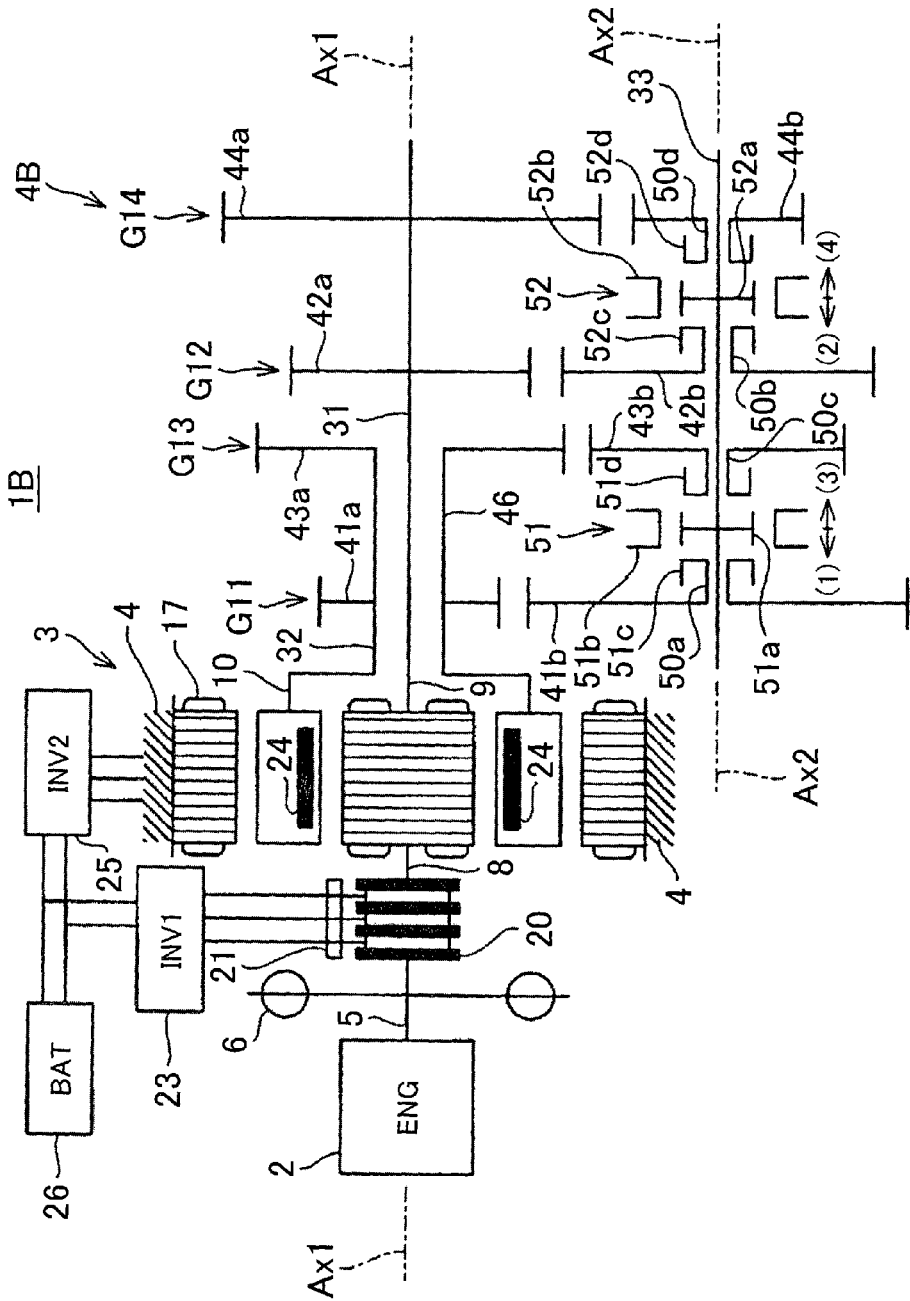
FIG. 2 is a schematic view of a drive unit for a vehicle according to a second embodiment of the present invention.

Next, a description will be made on the second embodiment with reference to FIG. 2. Common components in each of the embodiments will be denoted with the same reference numerals, and descriptions thereof will be either omitted or simplified. A description will be made with a focus on differences among the embodiments (the same applies to descriptions of the third to the sixth embodiments). A drive unit 1B corresponds to the drive unit 1A in FIG. 1 that is partially modified. The drive unit 1B is provided with an automatic transmission 4B. The automatic transmission 4B corresponds to the automatic transmission 4A in FIG. 1 from which the clutch 48 is removed. Because the clutch 48 is removed, in a case of the automatic transmission 4B in FIG. 2, the drive gears 42a, 44a of the second gear pair G12 and the fourth gear pair G14, which correspond to the even shift speeds, are directly fixed to the first input shaft 31. In other words, the first input shaft 31 of the automatic transmission 4B functions as a drive gear shaft that supports these gears 42a, 44a. The automatic transmission 4B has the same configuration as the automatic transmission 4A except the clutch 48. Therefore, the automatic transmission 4B has the same function and effect as the automatic transmission 4A of the first embodiment except an effect obtained by the clutch 48.

(Third Embodiment)

Figure 3:
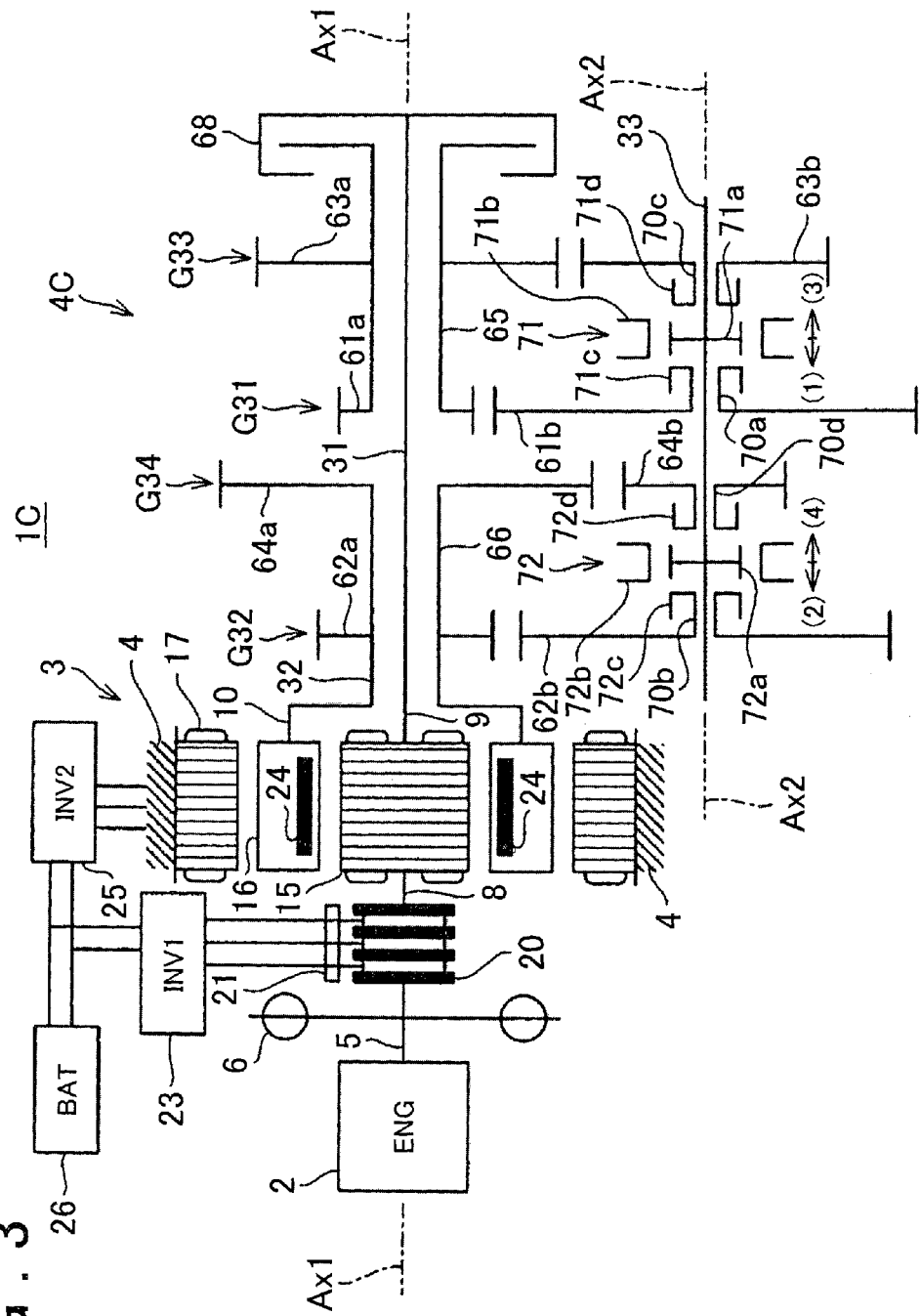
FIG. 3 is a schematic view of a drive unit for a vehicle according to a third embodiment of the present invention.

Next, a description will be made on the third embodiment with reference to FIG. 3. A drive unit 1C differs from the drive unit in the first or second embodiment in terms of the gear ratio of each of the gear pairs G31 to G34 and in terms of a point that the second gear pair G32 and the fourth gear pair G34 of an automatic transmission 4C, which correspond to the even shift speeds, are connected to the magnet rotor 16 and the first gear pair G31 and the third gear pair G33 of the automatic transmission 4C, which correspond to the odd shift speeds, are connected to the winding rotor 15. In addition, the startup shift speed is set at the second shift speed in the drive unit 1C. The gear ratio of the second gear pair G32, which corresponds to the second shift speed, is generally the same as the first gear pair G11 of the first or second embodiment. In the automatic transmission 4C, the gear ratio of the first gear pair G31 is set lower than the second gear pair G32. Therefore, it is preferred that the drive unit 1C be installed in a vehicle with a large weight range such as a truck or a bus. In other words, the first shift speed of the automatic transmission 4C is provided to respond to a bad condition where startup torque needs to be larger than the regular startup, such as when a vehicle with a large load or a large number of passengers has to start on a slope.

The first gear pair G31 of the automatic transmission 4C includes a drive gear 61a and a driven gear 61b that mesh with each other. The second gear pair G32 includes a drive gear 62a and a driven gear 62b that mesh with each other. The third gear pair G33 includes a drive gear 63a and a driven gear 63b that mesh with each other. The fourth gear pair G34 includes a drive gear 64a and a driven gear 64b that mesh with each other. The automatic transmission 4C includes two drive gear shafts 65, 66 to which each of the drive gears 61a to 64a is fixed. The first drive gear shaft 65 is formed in a hollow shape and is coaxially disposed on the outer side of the first input shaft 31. The first drive gear shaft 65 and the first input shaft 31 are connected to each other via a clutch 68. The clutch 68 is an automatic electromagnetic clutch, and a function and an effect thereof are the same as those of the clutch 48 of the first embodiment. The second drive gear shaft 66 is formed in a hollow shape and is integrated with the second input shaft 32. The automatic transmission 4C includes four driven gear shafts 70a to 70d to which the driven gears 61b to 64b included in the gear pairs G31 to G34 are respectively fixed. Each of the four driven gear shafts 70a to 70d is formed in a hollow shape and disposed in a coaxial manner with the output shaft 33 to be relatively rotatable with respect to the output shaft 33 about the rotational axis Ax2.

Among the four shift speeds that the automatic transmission 4C has, the second gear pair G32 and the fourth gear pair G34, which correspond to the even shift speeds, are interposed between the second input shaft 32 and the output shaft 33 while the first gear pair G31 and the third gear pair G33, which correspond to the odd shift speeds that are the rest of the shift speeds, are interposed between the first input shaft 31 and the output shaft 33. The automatic transmission 4C is also provided with two coupling devices 71, 72 that selectively couple the driven gears 61b to 64b included in the gear pairs G31 to G34 to the output shaft 33. The configurations and functions of these coupling devices 71, 72 are the same as those of the coupling devices 51, 52 according to the first or second embodiment. In other words, the first coupling device 71 includes an output-side hub 71a, a sleeve 71b, an input-side hub 71c, and an input-side hub 71d and changes from/to the first shift speed and from/to the third shift speed by operation of the sleeve 71b. The second coupling device 72 includes an output-side hub 72a, a sleeve 72b, an input-side hub 72c, and an input-side hub 72d and changes from/to the second shift speed and from/to the fourth shift speed by operation of the sleeve 72b.

The drive unit 1C can continuously change the rotational speed of the engine 2 by operating the compound motor 3 to adjust the difference in rotational speed between the winding rotor 15 and the magnet rotor 16. Accordingly, when a vehicle in which the drive unit 1C is installed runs at the fourth shift speed, which is the highest shift speed, it is possible to operate the engine 2 at an operating point where thermal efficiency of the engine 2 is the highest by using the above continuously changing function of the compound motor 3. Therefore, the fuel efficiency of the above vehicle improves at high speed. In addition, the second gear pair G32, which corresponds to the second shift speed that is the startup shift speed, is connected to the magnet rotor 16. Therefore, when the drive unit 1C is installed in a vehicle, the vehicle can be started by using the above-mentioned function of the compound motor 3 to amplify the torque. The other function and effect of the drive unit 1C are the same as those of the drive unit in the first embodiment.

(Fourth Embodiment)

Figure 4:
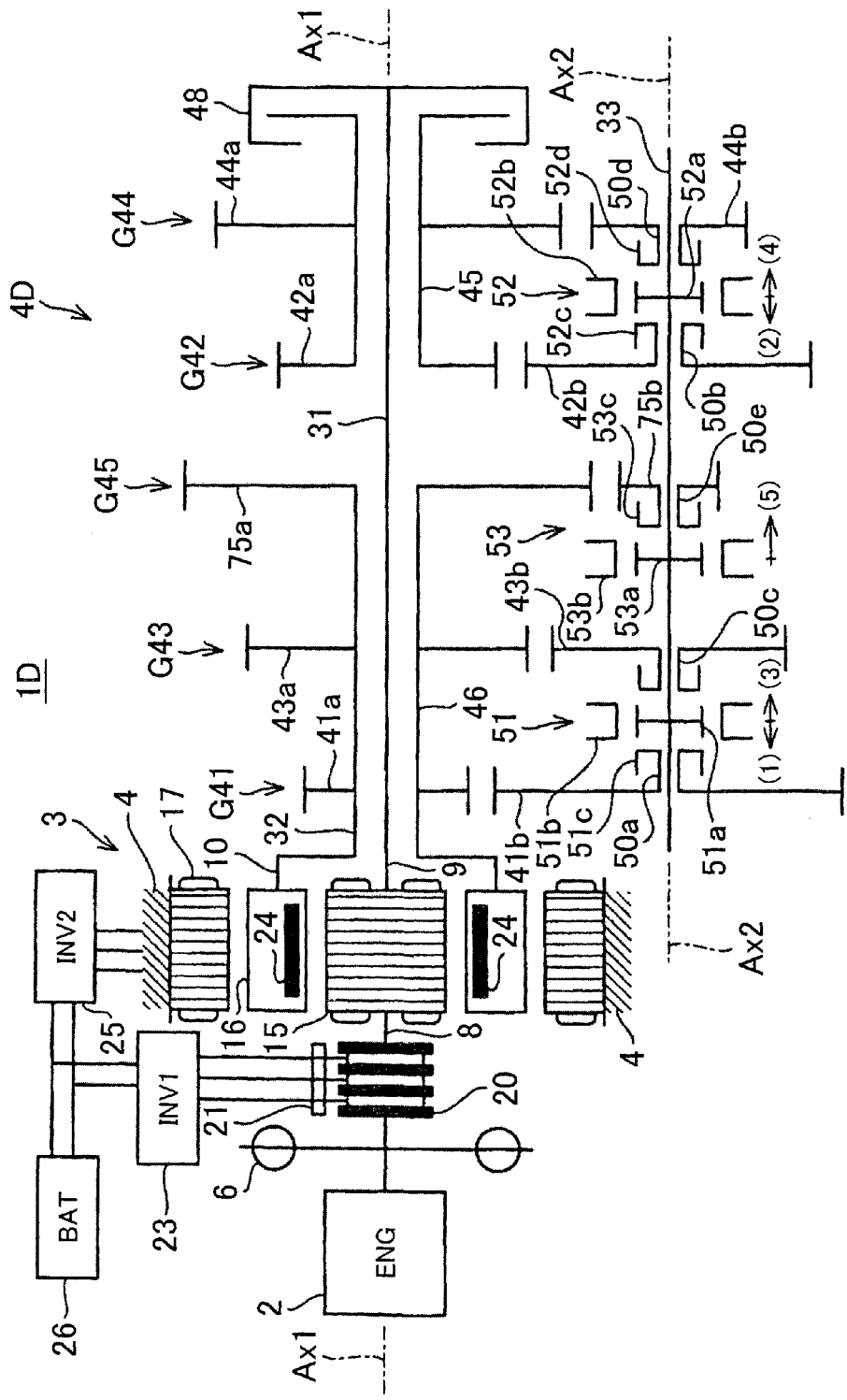
FIG. 4 is a schematic view of a drive unit for a vehicle according to a fourth embodiment of the present invention.

Next, a description will be made on the fourth embodiment of the present invention with reference to FIG. 4. A drive unit 1D corresponds to the drive unit 1A of the first embodiment in which the automatic transmission 4A is partially modified. In an automatic transmission 4D, a fifth shift speed as the highest shift speed is added to the automatic transmission 4A of the first embodiment. Each of the gear ratios from the first shift speed to the fourth shift speed of the automatic transmission 4D is the same as that of the automatic transmission 4A in the first embodiment. The first shift speed is set as the startup shift speed in the automatic transmission 4D.

With addition of the fifth shift speed, the first input shaft 31, the second input shaft 32, the second drive gear shaft 46, and the output shaft 33 are extended in the automatic transmission 4D, and a third coupling device 53 is disposed between a third gear pair G43 and a fifth gear pair G45 that corresponds to the fifth shift speed. The fifth gear pair G45 includes a drive gear 75a on the input side and a driven gear 75b on the output side. The drive gear 75a is fixed to an extended portion of the second drive gear shaft 46. The driven gear 75b is fixed to a driven gear shaft 50e. The driven gear shaft 50e is formed in a hollow shape and disposed in a coaxial manner with the output shaft 33 to be relatively rotatable with respect to the output shaft 33 about the rotational axis Ax2. The third coupling device 53 handles changing from/to the fifth shift speed and, as the other coupling devices 51, 52, includes an output-side hub 53a, a sleeve 53b, and an input-side hub 53c. The shift speed can be changed to the fifth shift speed by movement of the sleeve 53b of the third coupling device 53 in a direction (5) in the drawing.

Because the first shift speed to which the magnet rotor 16 is connected is set as the startup shift speed in the drive unit 1D, a vehicle can be started by using the above-mentioned function of the compound motor 3 to amplify the torque. Furthermore, because the fifth shift speed to which the magnet rotor 16 is connected is set as the highest shift speed, the engine 2 can be operated at the operating point where the thermal efficiency of the engine 2 is the highest by operating the compound motor 3 like the third embodiment shown in FIG. 3. Accordingly, the fuel efficiency of a vehicle to which the drive unit 1D is installed improves at high speed. Therefore, it is possible with the drive unit 1D to benefit from an advantage at startup that can be obtained by the compound motor 3 and from an advantage during running at the highest shift speed. In addition, the drive unit 1D obtains the same effect as that in the first embodiment by the clutch 48.

(Fifth Embodiment)

Figure 5:
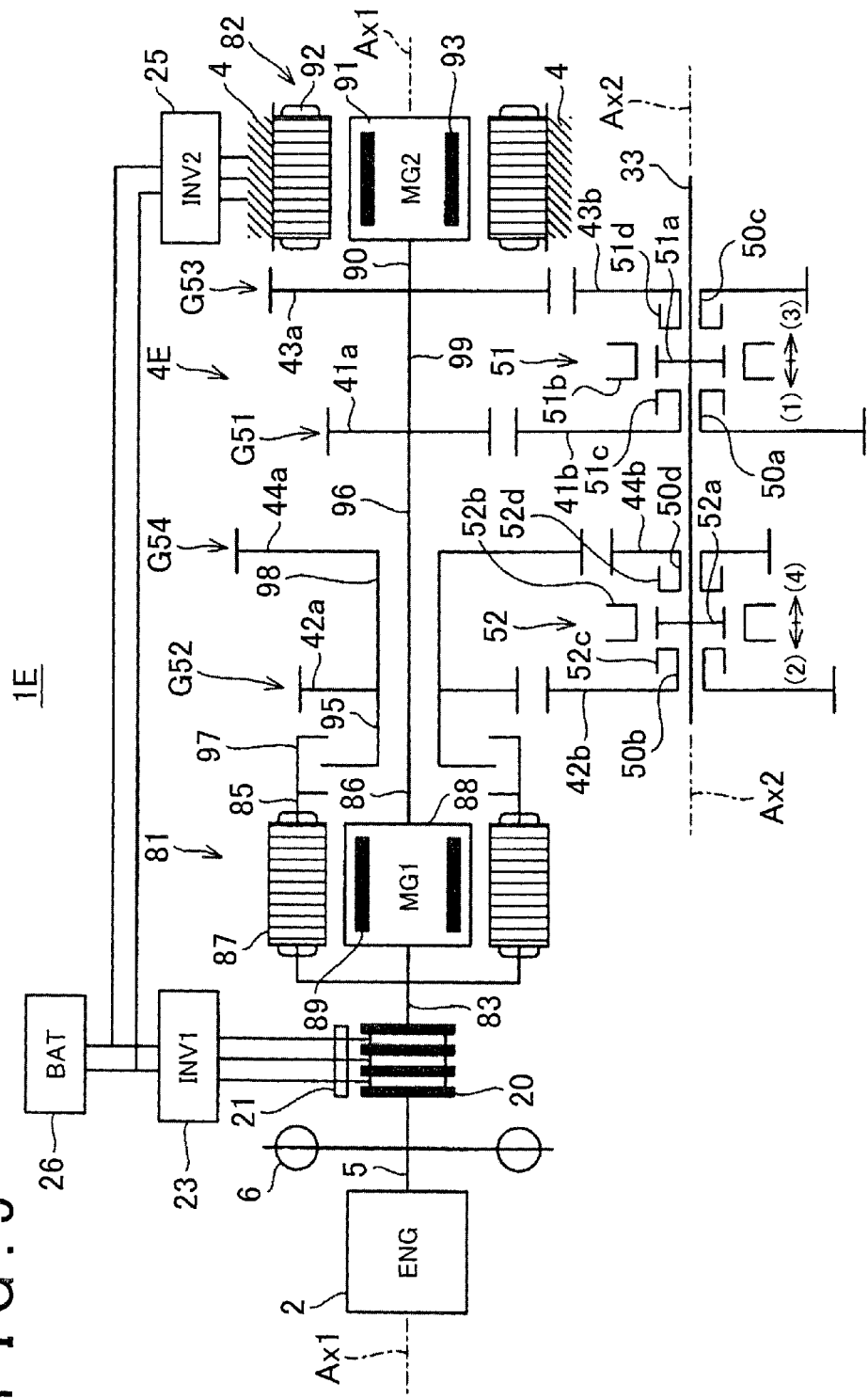
FIG. 5 is a schematic view of a drive unit for a vehicle according to a fifth embodiment of the present invention.

Next, a description will be made on the fifth embodiment with reference to FIG. 5. In a drive unit 1E, the compound motor 3 according to each of the above embodiments is divided into two motor generators 81, 82 in a way to be functionally equivalent, and these are connected to an automatic transmission 4E. Each of the motor generators 81, 82 combines a function as an electric motor and a function as an electric generator.

The first motor generator 81 has an input motor shaft 83 that is disposed on the rotational axis Ax1 and two output motor shafts 85, 86. The input motor shaft 83 is connected to the crankshaft 5. The first output motor shaft 85 is formed in a hollow shape, and the second output motor shaft 86 is disposed inside the inner periphery of the first output motor shaft 85. The second output motor shaft 86 is disposed on the rotational axis Ax1. These two output motor shafts 85, 86 are coaxially disposed to be relatively rotatable with respect to each other. The first motor generator 81 includes a winding rotor 87 that integrally rotates with the input motor shaft 83 and the first output motor shaft 85 and a magnet rotor 88 that is coaxially disposed inside the inner periphery of the winding rotor 87 in a state to be differentially rotatable therewith. The winding rotor 87 is electrically connected to the first inverter 23 via the slip ring 20 and the brush 21 that are mounted on the input motor shaft 83. Accordingly, electricity generated at the winding rotor 87 can be stored in the battery 26 via the first inverter 23 and supplied to the second motor generator 82 via the second inverter 25. The magnet rotor 88 holds plural permanent magnets 89 that are aligned in a state where polarities thereof are adjusted in a circumferential direction of the magnet rotor 88. The winding rotor 87 and the magnet rotor 88 respectively coiTespond to the first rotor according to the present invention and the second rotor according to the present invention. As being apparent from FIG. 5, because the first motor generator 81 has the winding rotor 87 and the magnet rotor 88 that are differentially rotatable with each other and outputs the power output of the engine 2 from these rotors 87, 88, the first motor generator 81 is to the differential motor according to an embodiment of the present invention.

The second motor generator 82 has a motor shaft 90 that is disposed on the rotational axis Ax1. The second motor generator 82 includes a rotor 91 (a third rotor) that integrally rotates with the motor shaft 90 and a stator 92 that is disposed on the radially outer side of the rotor 91 and is fixed to a fixing member such as the casing 4 in an unrotatable state. A permanent magnet 93 is held by the rotor 91. The stator 92 is electrically connected to the second inverter 25. Therefore, electricity generated by the second motor generator 82 can be stored in the battery 26 and supplied to the first motor generator 81 via the first inverter 23.

An automatic transmission 4E has two input shafts 95, 96 that are disposed on the rotational axis Ax1 and the output shaft 33 that is disposed on the rotational axis Ax2 as in the first embodiment. The first input shaft 95 is formed in a hollow shape and coaxially disposed on the outer side of the second input shaft 96 in a state to be relatively rotatable with respect to the second input shaft 96 about the rotational axis Ax1. The first input shaft 95 is connected to the first output motor shaft 85 of the first motor generator 81 via a clutch 97. The second input shaft 96 is integrated with the second motor output shaft 86 of the first motor generator 81. Furthermore, the motor shaft 90 of the second motor generator 82 is integrally connected to the second input shaft 96. Therefore, the magnet rotor 88 of the first motor generator 81 and the rotor 91 of the second motor generator 82 are connected to each other for integrated rotation with the second motor output shaft 86, the second input shaft 96, and the motor shaft 90 being interposed therebetween. The clutch 97 is configured as an automatic electromagnetic clutch like the clutch 48 of the first embodiment.

The automatic transmission 4E includes four gear pairs G51 to G54 that have the same gear ratios as the automatic transmission 4A of the first embodiment. The first gear pair G51, the second gear pair G52, the third gear pair G53, and the fourth gear pair G54 respectively correspond to the first shift speed, the second shift speed, the third shift speed, and the fourth shift speed. The gear pairs G51 to G54 respectively include the drive gears 41a to 44a and the driven gears 41b to 44b that are same as those in the first embodiment.

The drive gears 42a, 44a of the second gear pair G52 and the fourth gear pair G54, which correspond to the even shift speeds, are fixed to a first drive gear shaft 98. The first drive gear shaft 98 integrally rotates with the first input shaft 95. Therefore, the winding rotor 87 of the first motor generator 81 is connected to the drive gear 42a of the second gear pair G52 and the drive gear 44a of the fourth gear pair G54, which correspond to the even shift speeds. Meanwhile, the drive gears 41a, 43a of the first gear pair G51 and the third gear pair G53, which correspond to the odd shift speeds, are fixed to a second drive gear shaft 99 that is integrated with the second input shaft 96. Therefore, the magnet rotor 88 of the first motor generator 81 and the rotor 91 of the second motor generator 82 are connected to the drive gear 41a of the first gear pair G51 and the drive gear 43a of the third gear pair G53, which correspond to the odd shift speeds. The driven gears 41b to 44b are respectively fixed to the driven gear shafts 50a to 50d as in the first embodiment. Each of the driven gears 50a to 50d is formed in a hollow shape and is disposed on the outer side of the output shaft 33 to be relatively rotatable with respect to the output shaft 33.

Each of the coupling devices 51, 52 in the automatic transmission 4E functions as that in the first embodiment. The gear pairs G51 to G54 of the automatic transmission 4E are aligned oppositely from those in the first embodiment. However, relationships corresponding to the connections between the gear pairs G51 to G54 and the rotors 87, 89 in the drive unit 1E are the same as those in the first embodiment. In addition, the clutch 97 that is interposed between the first motor output shaft 85 and the first input shaft 95 of the automatic transmission 4E has the same function as the clutch 48 of the first embodiment. Therefore, the drive unit 1E produces the same effect as the drive unit 1A of the first embodiment.

Because the compound motor 3 is divided into the two motor generators 81, 82 in the drive unit 1E, there is no need to dispose the stator on the outer side of the two rotors. In other words, the two rotors (the winding rotor 87 and the magnet rotor 88) do not overlap with the stator 92 in a radial direction and are separated from the stator 92 in an axial direction (in a direction of the rotational axis Ax1). Therefore, it is possible with the drive unit 1E to benefit from an advantage that a radial dimension with the rotational axis Ax1 being a center can be decreased. In addition, when a vehicle in which the drive unit 1E is installed decelerates, energy during deceleration can be retrieved by the second motor generator 82 and can be returned to the battery or supplied to the first motor generator 81. Therefore, electricity consumption efficiency of the drive unit 1E improves.

(Sixth Embodiment)

Figure 6:
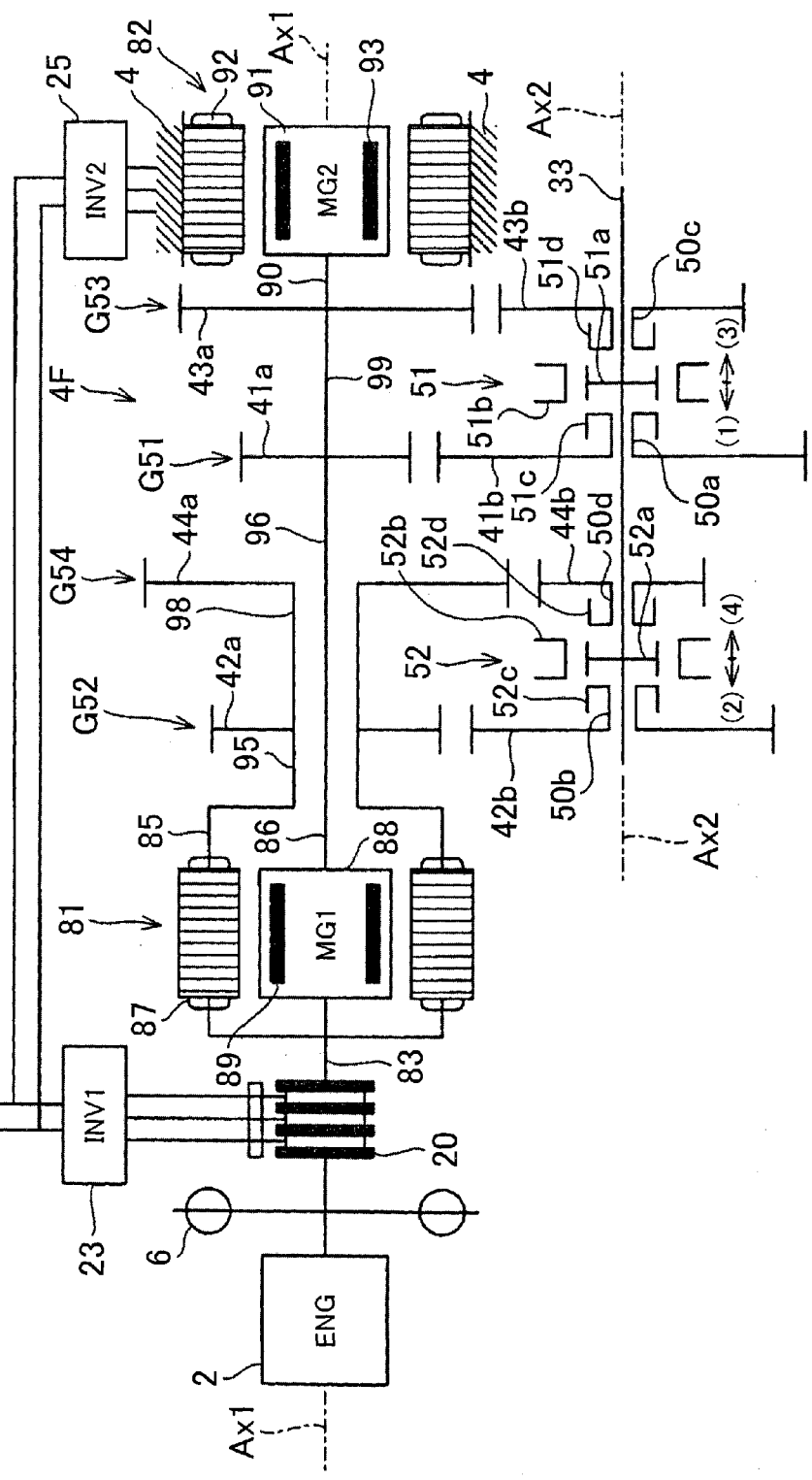
FIG. 6 is a schematic view of a drive unit for a vehicle according to a sixth embodiment of the present invention.

Next, a description will be made on the sixth embodiment with reference to FIG. 6. A drive unit 1F corresponds to the drive unit 1E in FIG. 5 that is partially modified. The drive unit 1F is provided with an automatic transmission 4F. The automatic transmission 4F corresponds to the automatic transmission 4E in FIG. 5 from which the clutch 97 is removed. Because the clutch 97 is removed, the first output motor shaft 85 of the first motor generator 81 constantly rotate with the first input shaft 95 of the automatic transmission 4F in an integrated manner. The automatic transmission 4F has the same configuration as the automatic transmission 4E except the clutch 97. Therefore, the automatic transmission 4F has the same function and effect as those of the automatic transmission 4E in the fifth embodiment except the effect obtained by the clutch 97.

The present invention is not limited to the above embodiments but can be carried out in various embodiments within the scope of the present invention. The differential motor of the present invention only needs to include at least two rotors that are differentially rotatable with each other. Therefore, it is not essential to construct the differential motor of the present invention as the compound motor that is applied in the first to fourth embodiments. In addition, because the differential motor is achieved by the first motor generator in the fifth and sixth embodiments, the second motor generator is not essential to carry out the present invention. In other words, the present invention can be carried out in a mode that the second motor generator is removed.

The number of shift speeds set for the automatic transmission is not particularly limited as long as it is plural. In addition, any shift speed can be set as the startup shift speed in accordance with engine performance or application of the drive unit.

The invention claimed is:

1. A drive unit for a vehicle, the drive unit comprising:
an engine;
a differential motor having a first rotor that is connected to the engine and that is rotatable, the differential motor having a second rotor that is differentially rotatable with the first rotor, and the differential motor being able to output power output of the engine from the first rotor or the second rotor; and
an automatic transmission configured to be able to change between plural shift speeds, the automatic transmission having plural gear pairs each of which corresponds to each of the shift speeds and an output shaft that is connected to an output side of the plural gear pairs, the automatic transmission configured to receive the power output of the engine via the differential motor, the automatic transmission configured to deliver the received power output of the engine to the output shaft, one of the first rotor and the second rotor being connected to an input side of the gear pair that corresponds to plural even shift speeds of the plural shift speeds, and the other of the first rotor and the second rotor being connected to an input side of the gear pair that corresponds to plural odd shift speeds of the plural shift speeds.

2. The drive unit according to claim 1, wherein
the first rotor is connected to the input side of the gear pair that corresponds to the plural even shift speeds, and
the second rotor is connected to the input side of the gear pair that corresponds to the plural odd shift speeds.

3. The drive unit according to claim 1, wherein
the first rotor is connected to an input side of the gear pair that corresponds to the highest shift speed of the plural shift speeds.

4. The drive unit according to claim 1, wherein
the second rotor is connected to an input side of the gear pair that corresponds to the highest shift speed of the plural shift speeds.

5. The drive unit according to claim 1, wherein
the first rotor is a winding rotor that is able to be energized,
the second rotor is a magnet rotor that holds a permanent magnet, and
the differential motor is a compound motor in which the magnet rotor is disposed on an outer side in a radial direction of the winding rotor to be coaxial with the winding rotor and in which a stator is disposed on an radially outer side of the magnet rotor and fixed in an unrotatable manner.

6. The drive unit according to claim 5, wherein
the winding rotor is connected to the input side of the gear pair that corresponds to the plural even shift speeds, and
the magnet rotor is connected to the input side of the gear pair that corresponds to the plural odd shift speeds.

7. The drive unit according to claim 5, wherein
the winding rotor is connected to an input side of the gear pair that corresponds to the highest shift speed of the plural shift speeds.

8. The drive unit according to claim 5, wherein
the magnet rotor is connected to an input side of the gear pair that corresponds to the highest shift speed of the plural shift speeds.

9. The drive unit according to claim 5, further comprising:
a clutch configured to disconnect or connect power transmission between the winding rotor and the automatic transmission.

10. The drive unit according to claim 9, wherein
the plural shift speeds include a startup shift speed that is used to start the vehicle, and
the magnet rotor is connected to an input side of the gear pair that corresponds to the startup shift speed.

11. The drive unit according to claim 1, further comprising:
a motor generator having a third rotor and a stator, the third rotor integrally rotating with the second rotor of the differential motor, and the stator being coaxially disposed with the third rotor and fixed in an unrotatable state.

12. The drive unit according to claim 11, wherein
the first rotor and the second rotor are separated from the stator in an axial direction.

* * * * *